2,990,561
DRIVING MECHANISM FOR WINDSHIELD WIPERS AND WINDSHIELD WASHING PUMP
Willy Bock and Hans Prohaska, Bietigheim, Württemberg, Germany, assignors to SWF-Spezialfabrik fur Autozubehor Gustav Rau G.m.b.H., Bietigheim, Wurttemberg, Germany
Filed Nov. 2, 1959, Ser. No. 850,455
Claims priority, application Germany Nov. 5, 1958
6 Claims. (Cl. 15—250.02)

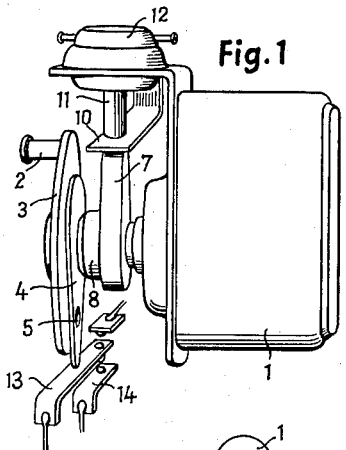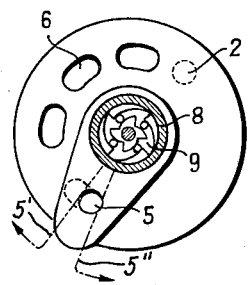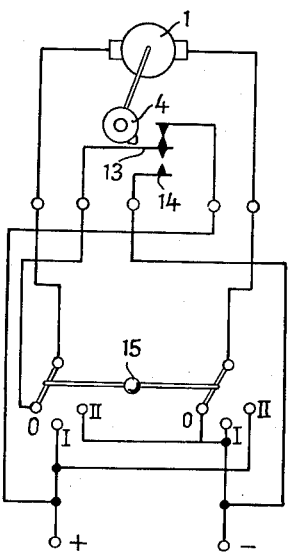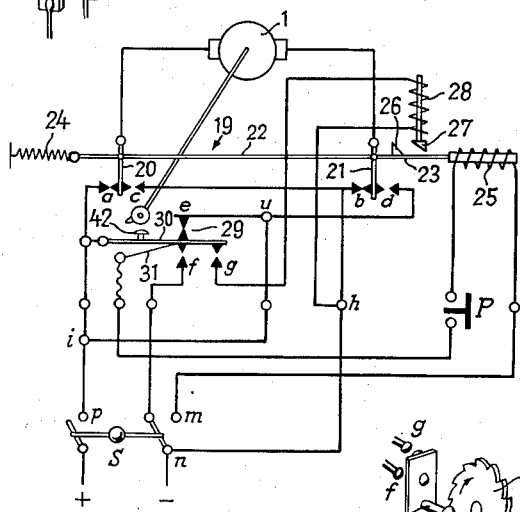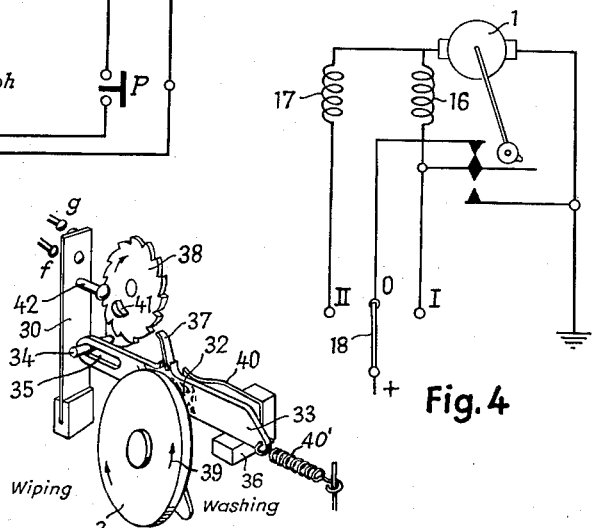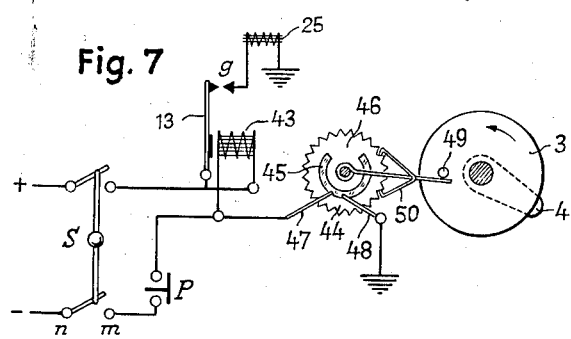
INVENTORS
Willy Bock, Hans Prohaska United States Patent Office 2,990,561
Patented July 4, 1961

The present invention relates to a driving mechanism for a windshield wiping and washing apparatus for a motor vehicle, and more particularly to an apparatus for operating either a windshield wiper alone or together with a pump for also spraying a washing fluid upon a windshield so that the windshield wiper can then clean the moistened windshield by wiping off the washing fluid.

The apparatus of this kind which were proposed prior to this invention required a coupling or locking element which was mechanically or electromagnetically actuated to disconnect the pump from the wiper motor. This coupling element engaged with the mechanical driving members intermediate the wiper and pump and also required a mechanical device for operating it. In any of these cases, the steady operation of the required gear elements was therefore interrupted. Furthermore, such adjustable gear elements are rather undesirable because of the difficulties involved in constructing and operating such a mechanism.

It is the principal object of the present invention to provide a driving mechanism for a windshield wiping and washing apparatus for a motor vehicle in which no gears or coupling elements of a common motor drive have to be shifted for operating either the windshield wiper alone or together with the pump for spraying a washing fluid upon a windshield.

This object is attained according to the present invention by providing a reversible motor which is adapted, when rotating in one direction, to drive the windshield wiper and, when rotating in the opposite direction, to drive not only the windshield wiper but also the pump for the washing fluid by means of a one-way coupling which is then automatically engaged. Such a coupling may be of any suitable design which is known as such and may be, for example, a slip coupling such as a freewheeling roller or ball coupling which is of a very simple construction and very efficient in operation. Also, such a slip coupling does not produce any noise and does not affect the design of the other driving elements.

Such a slip coupling also has the advantage that it may be used in cooperation with a mechanism for actuating the pump only for a certain length of time so that a special supervision of the washing process is not required. If desired, such a mechanism may also be designed to operate the pump repeatedly at certain time intervals.

These and other objects, features, and advantages of the present invention will become further apparent from the following detailed description thereof, particularly when the same is read with reference to the accompanying drawings, in which—

FIGURE 1 shows, somewhat diagrammatically, a side view of a reversible motor together with the power-transmitting elements according to the invention for driving a windshield wiper and a windshield washing pump;

FIGURE 2 shows a cross section taken through the hub of the motor shown in FIGURE 1 looking towards the left thereof.

FIGURE 3 shows a diagram of an electric circuit for reversing the direction of rotation of the motor by reversing the armature current;

FIGURE 4 shows a diagram of an electric circuit for reversing the direction of rotation of the motor by alternately connecting the two field windings of the motor;

FIGURE 5 shows a diagram of an electric control circuit for automatically reversing the direction of rotation of the motor;

FIGURE 6 shows a diagrammatic perspective view of a time control mechanism for switching off the pump drive automatically; while FIGURE 7 shows a diagrammatic side view of a modified time control mechanism according to the invention.

In the drawings, a reversible motor 1 is connected in the conventional manner by a crank pin 2 on a crank disk 3 to a windshield wiper mechanism, not shown, so as to drive the same. Crank disk 3 is rigidly secured to the shaft of motor 1 and carries a control arm 4 which is rotatably adjustable relative to crank disk 3 by being provided with a small stud 5 which is adapted to engage into one or another of a plurality of apertures 6 in crank disk 3. This control arm 4 may either be made of spring material and be biased so as to press against disk 3 or it may be pressed by a separate spring against crank disk 3 so as to require it to be lifted from disk 3 to disengage stud 5 from one aperture 6 to shift the control arm 4 to another position and to lock it in another aperture 6.

The shaft of motor 1 further carries an eccentric cam 7 with a hub 8 which is connected to the shaft by a suitable slip coupling 9 consisting, for example, of a plurality of steel balls which are adapted to be wedged between cam surfaces on the shaft and on the inner surface of hub 8 when the motor runs in one direction so as then to connect the eccentric cam 7 rigidly to the shaft, and to run freely between the shaft and the hub of cam 7 when the motor runs in the other direction so that cam 7 will then not be taken along by the motor shaft. The peripheral surface of cam 7 slides along a plate spring 10 which, in turn, engages with a plunger 11 for operating a pump 12 so as to spray a washing liquid through spray nozzles, not shown, upon a windshield when the eccentric cam 7 is taken along by the motor shaft through the locked slip coupling 9. Pump 12 may be, for example, a diaphragm or piston pump, although it may be of any other kind if properly connected to cam 7.

The free outer end of control arm 4 is adapted to engage once at every revolution with a contact spring 13 so as to move the same into engagement with another contact or contact spring 14 whereby, when the main switch is turned off the motor armature will be short-circuited and a short-circuit current be generated to stop the motor in one end position of the windshield wiper. This end position of the wiper blade on the windshield may be adjusted by an adjustment of control arm 4 on crank disk 3 as above described. Since, due to its width the control arm 4 would normally engage with contact spring 13 at two different points depending upon the direction of rotation of motor 1 and crank disk 3, as indicated in FIGURE 2 by arrows 5' and 5" and the angle enclosed between them, apertures 6 in crank disk 3 are made of an elongated shape so as to permit stud 5 to slip therein in one or the other direction when the driving direction of the motor is changed until it engages with the respective end wall of the aperture. Contact spring 13 will then be depressed and the motor be stopped at the same time during the rotation of control arm 4 in one or the other direction.

For reversing the direction of rotation of the motor, a double-throw switch 15 may according to FIGURE 3 be provided which, when set in the basic position 0, is adapted to prepare the short circuit for the armature of the motor. When switch 15 is turned to position I, the motor current will flow through the armature in one direction, and when turned to position II, it will flow through the armature in the other direction. The direction of rotation of motor 1 may thus be reversed simply by an operation of switch 15. When switch 15 is turned to position II, the eccentric disk 7 will be taken along by slip coupling 9 so that pump 12 will also be operated.

The off-position 0 of switch 15 may also be placed between the connecting positions I and II so that the motor may be driven immediately in one direction or the other and does not have to be driven first in one direction before it can be reversed to rotate in the other direction.

FIGURE 4 illustrates a modification of the circuit, in which motor 1 is provided with two field coils 16 and 17 which are wound in opposite directions to each other so that a simple one-pole switch 18 will be sufficient for operating the motor. When set to position I, switch 18 will close the motor circuit through field winding 16 so that motor 1 will rotate in one direction, while, when set to position II, it will close the motor circuit through field coil 17 which is wound in the opposite direction so that motor 2 will then also run in the opposite direction. If the motor is shunt-wound, the circuit may be revised in a well known manner. Of course, the direction of rotation of the motor may also be reversed by a reversing gear, by a reversal of the magnetic field or by a magnetic reversal of the armature current.

FIGURE 5 illustrates a further circuit for operating the motor in accordance with the invention. A double-throw reversing switch 19 has two contact blades 20 and 21 which are mechanically connected by an arm 22, the free outer end 23 of which may be attracted against the action of a spring 24 by an electromagnet 25. This arm 22, 23 also carries a lock member 26 which, when arm 23 is attracted by electromagnet 25, will engage and interlock with another lock member 27 which may be withdrawn from lock member 26 by another electromagnet 28 when the first electromagnet 25 is deenergized so that spring 24 can then return switch 19 to its original position. Obviously, the locking mechanism may also be of any other suitable type and may, for example, be unlocked by mechanical means which are operated by the speed-reduction gear of motor 1. The contacts on switch blade 20 are associated with stationary contacts $a$ and $c$, while the contacts on switch blade 21 are associated with stationary contacts $b$ and $d$. When switch arm 22, 23 is in the released position, as shown in FIGURE 5, switch blades 20 and 21 are connected to contacts $a$ and $b$ to drive motor 1 in one direction, that is, in the direction in which the windshield wiper alone will be driven, while when switch arm 22, 23 is attracted by electromagnet 25, switch blades 20 and 21 will be connected to contacts $c$ and $d$ to drive motor 1 in the other direction in which the pump for the washing fluid will be operated together with the windshield wiper. The circuit as illustrated in FIGURE 5 further contains a switch 29 which consists of a contact spring 30, the movement of which is effected and controlled by the expansion and contraction of a heating wire 31. This contact spring 30 is adapted to engage with contacts $e$ or $f$, respectively, for reversing the motor circuit or for short-circuiting the armature to stop the motor in its end position. Another contact on contact spring 30 is adapted to engage with a stationary contact $g$ which is connected to one end of the winding of electromagnet 28, the other end of which is connected at $h$ to the conductor leading to the negative terminal of the battery. The stationary contacts $e$ and $d$ are both connected at $u$ to a conductor which is connected at $i$ to the conductor leading to the positive terminal of the battery. A main switch S with stationary contacts $p$ and $m$ is provided for switching on the entire apparatus, while a pushbutton switch P is adapted to reverse the direction of rotation of motor 1.

If the motor is switched on by switch S so as to drive merely the windshield wiper, the current will flow from $p$ via $i$, $a$, 1, $b$, and $h$ directly to the negative terminal of the battery.

In order to reverse the direction of rotation of motor 1 so as to operate not only the windshield wiper, but also the washing pump 12, the pushbutton of switch P is to be depressed so that the current will then flow from $p$ via $i$, 30 31, P, 25, to $m$ and the negative terminal of the battery. Electromagnet 25 will then be energized to attract switch arm 22, 23, whereby switch blades 20 and 21 will be shifted into engagement with contacts $c$ and $d$ and be locked in this position by lock members 26 and 27. These locking members and the connection $u$—$i$ may be omitted if pushbutton switch P remains engaged during the washing process. If, however, switch P is only depressed for a short time and then again released, switch 19 will be locked by locking members 26 and 27, and the heating wire 31 will cool off and thereby draw contact spring 30 back to its central position. The current will then flow from $p$ via $i$, $u$, $d$, 1, $c$, and $h$ back to $m$, whereby the direction of rotation of motor 1 will be reversed and pump 12, as shown in FIGURE 1, will be driven together with the windshield wipers.

The length of time of the windshield washing process may also be controlled automatically by automatically interrupting or terminating the operation of pump 12. This may be done by many different kinds of control mechanisms and either mechanically, electrically, or by electronic means. A simple mechanical control mechanism is diagrammatically illustrated in FIGURE 6, in which a disk which is driven by the motor shaft, for example, the crank disk 3 as shown in FIGURE 1, is held during the rotation of the motor in the direction for operating the pump in engagement with a friction surface 32 of a limited extent on an arm 33 which is slidable— also to a limited extent—on a pin 34 in an elongated aperture 35 in arm 33 and on a pin 36 which is mounted in a fixed position. Arm 33 carries a spring arm 37 which engages with a ratchet wheel 38 so that, when disk 3 rotates in the washing direction, as shown by arrow 39, it will by its engagement with friction surface 32, which is resiliently supported on the other side by sheet spring 40, shift arm 33 to the left as viewed in FIGURE 6 so that the latter will shift ratchet wheel 38 by the distance of one tooth. At this time, friction surface 32 will be substantially out of engagement with disk 3 and arm 33 will be drawn back to its original position by a spring 40' so that friction surface 32 will again be in engagement with disk 3 and the shifting process of arm 33, spring arm 37, and ratchet wheel 38 will be repeated. After a certain length of time of, for example, 20 seconds, corresponding to one revolution of ratchet wheel 38, a stud 41 on wheel 38 will be moved into engagement with and past a pin 42 which thereby shifts contact spring 30 toward the left, as seen in FIGURE 6, so that the contacts of spring 30 will engage with contacts $f$ and $g$, as shown in FIGURE 5. The engagement of contact $f$ will, however, at first not produce any special effect as long as the main switch S remains in the closed position on $m$. Electromagnet 28 will then be energized from contact $g$ so as to withdraw locking member 27 from locking member 26 so that switch 19 can under the action of spring 24 return to its original position in which switch blades 20 and 21 engage with contacts $a$ and $b$, whereby motor 1 will again be reversed so as to drive merely the windshield wipers until the windshield has been wiped dry when switch S is turned off by hand.

When switch S is being turned off, a short circuit through the armature of motor 1 will be closed and a current then generated will flow from 1, via $a$, 30, $f$, $n$, and $b$ back to 1. The armature short circuit for braking the motor so as to stop the wipers in their end position proceeds in accordance with the position of control arm 4 on crank disk 3. Contact $f$ according to FIGURES 5 and 6 is then connected in parallel to contact 13, as shown in FIGURE 1.

Another embodiment of an automatic control mechanism for the washing process is illustrated in FIGURE 7, the circuit of which substantially corresponds to FIGURE 5, except that, for closing the armature short circuit, the contact spring 13, which is provided in any case, is used in place of contact spring 30. This contact spring 13 is then operated by an electromagnet 43 which, after pushbutton switch P is depressed, is energized by a current passing through it from switch S via $m$ and P. The additional contact $g$ associated with contact spring 13 is in this case connected to electromagnet 25 for controlling the operation of switch 19. Since pushbutton switch P should be actuated only for a short time, a holding circuit is formed by the provision of a ratchet wheel 44 of insulating material with a curved contact strip 45 thereon which is interrupted by a gap 46, and a pair of contact arms 47 and 48 engaging with contact strip 45 at a certain distance from each other. After the motor has started to rotate crank disk 3 in the direction shown by the arrow, a pin 49 on disk 3 will engage once at every revolution of disk 3 with a one-way acting pawl 50 to turn ratchet wheel 46. The holding current will then remain effective until ratchet wheel 44 has been turned so far that the connection between contact arms 47 and 48 will be interrupted by the gap 46 in contact strip 45. Electromagnet 43 will then be deenergized and release contact spring 13 and thereby interrupt contact $g$ so that the control magnet 25 of switch 19 will be deenergized and the circuit will be reestablished through contacts $a$ and $b$ to reverse the driving direction of the motor so as to operate only the windshield wipers.

Although our invention has been illustrated and described with reference to the preferred embodiments thereof, we wish to have it understood that it is in no way limited to the details of such embodiments, but is capable of numerous modifications within the scope of the appended claims.

Having thus fully disclosed our invention, what we claim is:

1. A driving mechanism for operating a windshield wiper and a pump for spraying a washing fluid upon a windshield of a motor vehicle, comprising a reversible electric motor having a shaft, means for connecting said windshield wiper to said motor shaft so as to be driven thereby in both directions of rotation of said shaft and means for also connecting said pump to said motor shaft when said shaft rotates in one direction and for disconnecting said pump from said shaft when said shaft rotates in the opposite direction.

2. A driving mechanism as defined in claim 1, further comprising a power-transmitting member for operating said pump, and a slip coupling for positively connecting said member to said motor shaft when the latter rotates in one direction to operate said windshield wiper as well as said pump, and for automatically releasing said member from said shaft when the latter rotates in the other direction to operate only said windshield wiper.

3. A driving mechanism as defined in claim 2, further comprising control means adapted to be operated by said motor simultaneously with its reversal so as to operate said pump only for a certain length of time before the rotation of said motor is again reversed to drive only said windshield wiper.

4. A driving mechanism as defined in claim 2, further comprising a control member mounted on said motor shaft, and means adapted to be acted upon by said control member for stopping the operation of said windshield wiper in one end position thereof by short-circuiting the armature of said motor and thereby generating a short-circuit current to stop said motor.

5. A driving mechanism as defined in claim 4, in which said control member is adjustable for varying the end position in which said windshield wiper is stopped.

6. A driving mechanism as defined in claim 4, in which said control member is adapted to act upon said control means to prepare the next reversal of said motor so as to occur at a certain delay of time.

References Cited in the file of this patent

UNITED STATES PATENTS 2,878,505    Ziegler _____ Mar. 24, 1959

FOREIGN PATENTS 1,020,538    Germany _____ Dec. 5, 1957